US012386663B2

(12) United States Patent
Young, Jr. et al.

(10) Patent No.: US 12,386,663 B2
(45) Date of Patent: Aug. 12, 2025

(54) DYNAMICALLY ADJUSTING RESOURCE ALLOCATION

(71) Applicant: Capital One Services, LLC, McLean, VA (US)

(72) Inventors: Michael Anthony Young, Jr., Henrico, VA (US); Christopher McDaniel, Glen Allen, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 638 days.

(21) Appl. No.: 17/809,933

(22) Filed: Jun. 30, 2022

(65) Prior Publication Data
US 2024/0004711 A1    Jan. 4, 2024

(51) Int. Cl.
G06F 9/50    (2006.01)

(52) U.S. Cl.
CPC .......... *G06F 9/5011* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 9,871,741 B2* | 1/2018 | Kurtzman | G06F 9/5016 |
| 11,061,727 B1* | 7/2021 | Gnyp | G06F 16/2477 |
| 2015/0036504 A1* | 2/2015 | McMurry | H04L 47/127 370/235 |
| 2023/0350717 A1* | 11/2023 | Neate | G06F 9/5088 |

* cited by examiner

*Primary Examiner* — Eric C Wai
(74) *Attorney, Agent, or Firm* — Foley & Lardner LLP

(57) ABSTRACT

Methods and systems are described herein for a resource allocation system. The resource allocation system may obtain a corresponding quantity of resources (e.g., memory, processor, storage, etc.) needed to be allocated for each resource class (e.g., for a given performance class) for a particular time period (e.g., for one month). Furthermore, the resource allocation system may track allocation of each class of resources and may predict that some classes of resources will be oversubscribed. Based on the prediction, the resource allocation system may, using a machine learning model, identify supplemental classes for each resource class predicted to be oversubscribed and generate a warning when a resource of a supplemental class is predicted to be used.

20 Claims, 7 Drawing Sheets

200

| Resource Class | Utilization Value | Predicted Oversubscribed? |
|---|---|---|
| Resource Class 1 | 90 | True |
| Resource Class 2 | 20 | False |
| Resource Class 3 | 30 | False |
| Resource Class 4 | 35 | False |

| Oversubscribed Resource Class (303) | Supplemental Resource Class (306) | Probability (309) |
|---|---|---|
| Resource Class 1 | Resource Class 3 | .9 |
| Resource Class 1 | Resource Class 2 | .8 |
| Resource Class 1 | Resource Class 4 | .1 |

| Training utilization data | Periodic training threshold data | Resource class data |
|---|---|---|
| <utilization_data_1> | <threshold_data_1> | Resource class 1 – O<br>Resource class 2 – S<br>Resource class 3 - S |
| <utilization_data_2> | <threshold_data_2> | Resource class 4 – O<br>Resource class 5 – S<br>Resource class 6 - S |
| <utilization_data_3> | <threshold_data_3> | Resource class 1 – O<br>Resource class 4 – S<br>Resource class 5 - S |
| <utilization_data_4> | <threshold_data_4> | Resource class 6 – O<br>Resource class 2 – S<br>Resource class 3 - S |
| <utilization_data_5> | <threshold_data_5> | Resource class 2 – O<br>Resource class 5 – S<br>Resource class 6 - S |

503 — Training utilization data
506 — Periodic training threshold data
509 — Resource class data

FIG. 5

DYNAMICALLY ADJUSTING RESOURCE ALLOCATION

BACKGROUND

With the emergence of cloud-based computing, resource allocation problems have come to the forefront of technology. Many resource allocation problems that have appeared in the past had their origins in resource constraints within a single system (e.g., within a mainframe or within a server system). Cloud-based resource constraints are much more complex because there are many computing systems that share certain resources, and usage of those resources needs to be taken into account when performing allocation. For example, in the past, a single operating system was installed on a hardware server system and that operating system was enabled to control resource (e.g., hardware resource) allocation on that server. Thus, when a particular process was utilizing too many processor cycles or too much memory, the operating system would be enabled to limit that process or stop that process.

However, current cloud-based implementations enable multiple logical server systems to be hosted on a single hardware system. Thus, it is more difficult to control hardware resource utilization. To solve some of these issues, providers started using different classes of hardware systems. For example, some hardware systems would guarantee a particular level of performance, while other hardware systems would guarantee a higher or lower level of performance. Yet other hardware systems would not offer any performance guarantees. However, in many cases a certain class of resource (e.g., a resource with no guaranteed performance) may be predicted to be oversubscribed. Thus, a resource allocation problem may occur in the future when that resource is exhausted. Accordingly, it may be useful to periodically determine how a particular resource class can be supplemented by a different resource class so that when a resource is required, resource allocation may be dynamically adjusted.

SUMMARY

Therefore, methods and systems are described herein for dynamically adjusting resource allocation. A resource allocation system may be used to perform operations disclosed herein. In some embodiments, the resource allocation system may obtain a corresponding quantity of resources (e.g., a number of servers) needed to be allocated for each resource class (e.g., for a given performance class) for a particular time period (e.g., for one month). Furthermore, the resource allocation system may track allocation of each class of resources and may predict that some classes of resources will be oversubscribed. Based on the prediction, the resource allocation system may, using a machine learning model, identify supplemental classes for each resource class predicted to be oversubscribed and generate a warning when a resource of a supplemental resource class is predicted to be used.

The resource utilization system may receive resource utilization data for a first time period. The resource utilization data may include a set of resource classes and corresponding utilization values for the set of resource classes. For example, the resource utilization system may be monitoring a cloud computing environment that uses resources for various logical server systems. Those resources may be divided into different resource classes (e.g., high performance, medium performance, lower performance, etc.). The monitoring data may be received periodically (e.g., every day, every week, every two weeks, twice per month, or at another suitable frequency). The resource utilization data may include utilization of cloud resources for different resource classes. For example, utilization data generated for a one-week period may indicate that each resource class has a particular number of resources in use.

Furthermore, the resource utilization system may generate, based on past utilization of resources, periodic utilization threshold data for each resource class of the set of resource classes. The periodic utilization threshold data may be generated for a second time period longer than and including the first time period. For example, the periodic threshold utilization data may be generated every month. However, the periodic threshold data may be generated weekly, biweekly, yearly, or with another suitable frequency. The resource utilization system may use past utilization data for this operation. For example, for each resource class, the resource utilization system may determine resource usage metrics for a past month, or another past time period. In some embodiments, the resource utilization system may use a mean or a median for a number of previous periods. For example, a first resource class may have had an average of one hundred logical servers created during a previous month, a second resource class may have had an average of ten logical servers created during the same time period, and a third resource class may have had an average of fifty logical servers created during the same time period. Based on those numbers, the resource utilization system may generate periodic utilization threshold data for each resource class (e.g., one hundred for the first resource class, ten for the second resource class, and fifty for the third resource class).

The resource utilization system may then predict, based on the resource utilization data and the periodic utilization threshold data, one or more resource classes of the set of resource classes that will be oversubscribed by an end of the second time period. For example, the resource utilization data received at a first week mark of a monthly cycle may indicate that forty-seven logical servers of the third resource class have been already created and are used. That is, if four more logical servers of the third resource class are created in the next three-plus weeks, the third resource class will be oversubscribed. Thus, the resource utilization system may predict that the third resource class will be oversubscribed. The resource utilization system may perform the same or similar calculation for other resource classes. In some embodiments, the resource utilization system may use machine learning techniques to determine which resource classes will be oversubscribed.

The resource utilization system may input, into a machine learning model, the resource utilization data, the periodic utilization threshold data, and one or more indications of the one or more resource classes predicted to be oversubscribed to obtain indications of one or more supplemental resource classes for utilization reduction to address predicted oversubscription of the one or more resource classes. That is, the resource utilization system may use a machine learning model to discover supplemental resource classes for when a particular resource class will become oversubscribed. For example, there may be twenty different resource classes available within a cloud environment. The resource utilization system may determine that three of the twenty resource classes are predicted to be oversubscribed and use a machine learning model to identify one or more of the other seventeen resource classes that may serve as supplemental resource classes when a particular oversubscribed resource class reaches capacity.

The resource utilization system may also predict that a resource of a supplemental resource class of the one or more supplemental resource classes will be used. For example, the resource utilization system may receive a request from a user to create a new logical server. The request may include some criteria that may associate the new logical server with a supplemental resource class. Thus, the resource utilization system may predict that a resource associated with a supplemental resource class will be used.

The resource utilization system may generate a warning that includes a first indication of the supplemental resource class and a second indication of a resource class that is predicted to be oversubscribed. For example, the resource utilization system may generate a display screen indicating that a particular resource is about to be created of a given resource class and that the given resource class is a supplemental resource class for another resource class that is predicted to be oversubscribed.

In some embodiments, the resource utilization system may use a prioritization system to identify and/or narrow supplemental classes. For example, an oversubscribed class may be associated with a first priority and any supplemental classes may have to be associated with the same or higher priority or they are filtered from the results. In some embodiments, the priority data may be input into the machine learning model so that the priority is considered when supplemental resource classes are output by the machine learning model.

In some embodiments, instead of or in addition to considering priority for supplementing resource classes, the resource allocation system may use a map of which classes are available to be used as supplements for other classes. For example, a resource class that is enabled to handle resources that are heavily used may not be supplemented by a resource class that is enabled to handle less heavy usage.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates a data structure for storing a status for each resource, in accordance with one or more embodiments of this disclosure.

FIG. 3 illustrates a data structure representing an output of the machine learning model for each resource class, in accordance with one or more embodiments of this disclosure.

FIG. 5 illustrates a table that may store training data for training the machine learning model, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
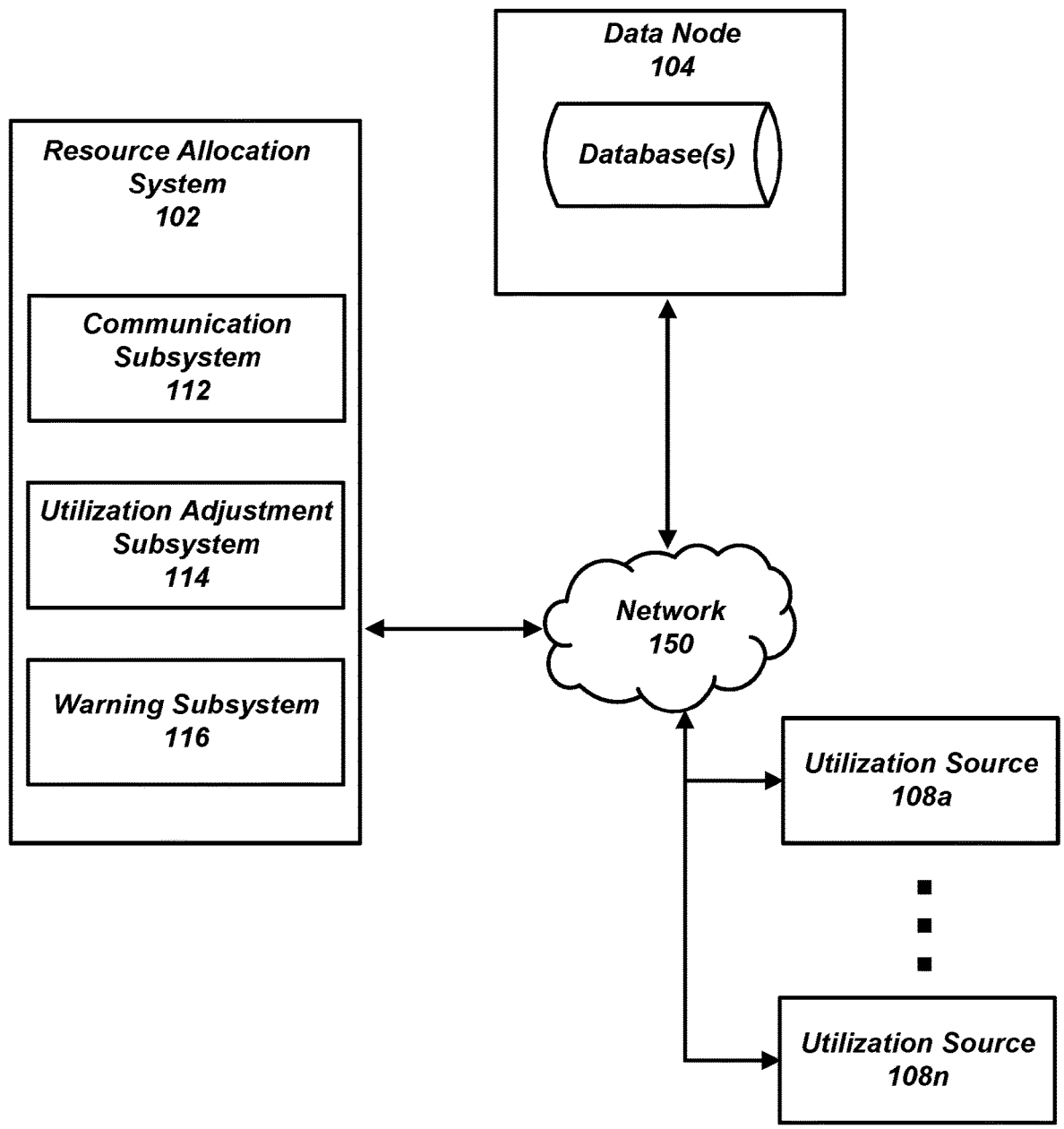
FIG. 1 shows an illustrative system for dynamically adjusting resource allocation, in accordance with one or more embodiments of this disclosure.

FIG. 1 shows an example environment 100 for dynamically adjusting resource allocation. Environment 100 includes resource allocation system 102, data node 104, and utilization sources 108a-108n. Resource allocation system 102 may execute instructions for adjusting resource allocation. Resource allocation system 102 may include software, hardware, or a combination of the two. For example, resource allocation system 102 may be hosted on a physical server or a virtual server that is running on a physical computer system. In some embodiments, a portion of a resource allocation system 102 may be configured on a user device (e.g., a laptop computer, a smartphone, a desktop computer, an electronic tablet, or another suitable user device) and another portion may be configured on a server device. For example, the user may use a client device to configure the system, which may then execute instructions on a server device.

Data node 104 may store various data, including one or more machine learning models, training data, resource class definition data, and/or other suitable data. In some embodiments, data node 104 may also be used to train the machine learning model. Data node 104 may include software, hardware, or a combination of the two. For example, data node 104 may be a physical server, or a virtual server that is running on a physical computer system. In some embodiments, resource allocation system 102 and data node 104 may reside on the same hardware and/or the same virtual server/computing device. Network 150 may be a local area network, a wide area network (e.g., the Internet), or a combination of the two. Utilization sources 108a-108n may be logical devices such as logical servers, logical workstations, or other suitable logical devices (e.g., logical devices that are able to share hardware resources such as physical servers).

In some embodiments, utilization sources may be computing devices that instantiate logical resources. For example, a cloud computing system may include one or more logical/physical allocation devices that enable a user to build/initialize a virtual server. Each allocation device may be a single utilization source of utilization sources 108a-108n. Thus, utilization sources 108a-108n may store utilization information including a number and type (e.g., class)

of resources (e.g., servers) built and initialized that are currently running. As discussed herein, the term resource class may sometimes be referred to as simply class.

The resource allocation system described herein may be used outside of cloud computing environments. For example, the resource allocation system may be used for personal allocation of expenses (e.g., monthly expenses). Thus, resource allocation system 102 may reside on a user device (e.g., a smartphone, an electronic tablet, a laptop computer, a desktop computer, or another suitable user device). Resource allocation system 102 may be enabled to access one or more accounts associated with the user (e.g., bank accounts, credit card accounts, or other suitable accounts). Based on the information in those accounts, resource allocation system 102 may perform operations described below.

Resource allocation system 102 may receive resource utilization data for a first time period. The resource utilization data may include a set of resource classes and corresponding utilization values for the set of resource classes. Resource allocation system 102 may receive the resource utilization data using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the resource utilization data from data node 104 or from another computing device.

In some embodiments, communication subsystem 112 may receive the resource utilization data from one or more utilization sources 108a-108n. Resource utilization data may include a number of resources that have been instantiated (e.g., a number of server devices that have been built and are running), corresponding classes of those resources (e.g., uptime guarantee level or another suitable class), and/or other suitable resource utilization data. In some embodiments, utilization sources 108a-108n may transmit the resource utilization data to data node 104. Data node 104 may store the data in a database and transmit the resource utilization data and/or an indication of new resource utilization data to resource allocation system 102.

The resource utilization data may correspond to a particular time period (e.g., a day, a week, a month, or another suitable time period). For example, a particular cloud-based computing environment may track resource utilization weekly, although another time period may be used (e.g., daily, monthly, etc.). The resource utilization data may be compiled, for example, monthly so that new resources may be planned and introduced into an environment. For example, new hardware may be introduced into the environment to enable building/initializing new logical server systems on that new hardware. Thus, resource allocation system 102 may receive resource utilization data weekly for monthly planning of resources. In some embodiments, the resource utilization data may be received daily, bimonthly, or at another suitable time interval.

In some embodiments, periodic utilization data may be monthly utilization data for client resources. The monthly utilization data may include, for example, a number (or an amount) of resources used that month. This may include a number of virtual servers built and initialized and a class associated with each virtual server. In addition to virtual servers, periodic utilization data may include utilization for other logical devices (e.g., workstations, routers, switches, etc.). Furthermore, the monthly utilization data may include a class of each resource that was initialized. Thus, the data may be aggregated to generate an amount or a number of resources of each class that was built and initialized during each month.

In another example, resource allocation system 102 may monitor a user's accounts (e.g., bank accounts, credit card accounts, and/or other suitable accounts) for resource utilization (e.g., currency, credit, and/or other suitable resources). Thus, resource allocation system 102 may receive transaction information from the user's account or accounts. The transaction information may be received weekly, daily, bimonthly, monthly, or at another suitable interval. Communication subsystem 112 may pass the resource utilization data, or a pointer to the resource utilization data in memory, to utilization adjustment subsystem 114.

Utilization adjustment subsystem 114 may include software components, hardware components, or a combination of both. For example, utilization adjustment subsystem 114 may include software components (e.g., API calls) that access one or more machine learning models. Utilization adjustment subsystem 114 may generate, based on past utilization of resources, periodic utilization threshold data for each resource class of the set of resource classes. The periodic utilization threshold data may be generated for a second time period longer than and including the first time period. For example, utilization adjustment subsystem 114 may receive (e.g., via communication subsystem 112) periodic utilization data. Periodic utilization data may be utilization data for each of a plurality of past periods.

In some embodiments, utilization adjustment subsystem 114 may receive a plurality of cloud resource classes and periodic utilization threshold data for each cloud resource class (e.g., monthly utilization data for each logical device built/initialized in a datacenter). That is, utilization adjustment subsystem 114 may receive, from one or more cloud controllers, cloud resource utilization data for a portion of a current time cycle. The cloud resource utilization data may include a set of resource classes and corresponding utilization values for the set of resource classes. In some embodiments, each utilization source of utilization sources 108a-108n may be a cloud controller.

In some embodiments, utilization adjustment subsystem 114 may generate, based on past utilization of cloud resources, periodic utilization threshold data for each resource class of the set of resource classes. The periodic utilization threshold data may be generated for a periodic time cycle. For example, the periodic time cycle may be a month and the data for past utilization cloud resources may be monthly resource consumption data for each of a number of months (e.g., six months, twelve months, twenty-four months, or another suitable time period). Thus, utilization adjustment subsystem 114 may generate monthly thresholds (e.g., monthly averages) for resource usage for each class.

In some embodiments, periodic utilization data may be monthly utilization data for accounts associated with a user. For example, utilization adjustment subsystem 114 may retrieve a plurality of transactions from a plurality of user accounts associated with a user. The transactions may include monthly mortgage payments, entertainment expenses, grocery expenses, bills, and other suitable transactions. Utilization adjustment subsystem 114 may divide the expenses into classes (e.g., grocery expenses, housing costs, entertainment, etc.). Each class may have an associated amount of money (resources) spent on that class. In some embodiments, instead of classifying the expenses, utilization adjustment subsystem 114 may receive a plurality of classes and a utilization (e.g., an amount of money) spent on those expenses.

When the past utilization data is received for a plurality of time periods (e.g., for the past six months, twelve months, twenty-four months, or for another suitable period), utilization adjustment subsystem 114 may generate periodic utilization threshold data for each resource class. For example, each resource class may be associated with a type of uptime guarantee in a cloud computing environment. In some embodiments, each resource class may correspond to a set of performance metrics (e.g., processor speed/number, memory size, storage size, etc.). Thus, each performance class may have a particular utilization associated with it (e.g., a number of logical devices that have resources allocated to the specific performance class). Accordingly, utilization adjustment subsystem 114 may generate periodic utilization threshold data for each class. The periodic utilization threshold data for each class may be an average of utilization for each class or another suitable utilization.

To continue with the example above, periodic utilization threshold data may indicate that a particular number of logical devices associated with a particular set of performance metrics (e.g., processor speed/number, memory size, storage size, etc.) was utilized over a particular number of months (e.g., twelve months) on average. There may be multiple sets of performance metrics corresponding to different classes of resources. Furthermore, the first time period described above may be a week while the second time period may be a month. Thus, in one example, resource allocation system 102 may receive weekly utilization statistics for a currently running time period (e.g., one month). In addition, resource allocation system 102 may generate the periodic utilization threshold data based on utilization from prior months.

In another example, the periodic utilization threshold data may be generated based on past months' spending for a particular user (e.g., based on received user account transaction data). For example, resource allocation system 102 may receive spending data for the past twelve months and generate average spending for each resource class for the current month. Furthermore, the resource utilization data may be received on a weekly basis or daily basis. For example, resource allocation system 102 may monitor the user's spending patterns for the current month and retrieve the transaction data weekly or daily.

Utilization adjustment subsystem 114 may predict, based on the resource utilization data and the periodic utilization threshold data, one or more resource classes of the set of resource classes that will be oversubscribed by an end of the second time period. For example, utilization adjustment subsystem 114 may receive resource utilization data for a plurality of resource classes on a weekly basis. Furthermore, utilization adjustment subsystem 114 may compare the received resource utilization data with periodic utilization threshold data, which may be monthly threshold data. Thus, if for a particular class of resource class weekly utilization data for a first week of the month indicates that ninety-five percent of a particular resource class has been utilized, utilization adjustment subsystem 114 may predict that that particular resource class will be oversubscribed. Utilization adjustment subsystem 114 may use one or more rules to determine when a particular resource is predicted to be oversubscribed.

In the case of cloud computing resource utilization, utilization adjustment subsystem 114 may predict, based on the cloud resource utilization data and the periodic utilization threshold data, resource classes of the set of resource classes that will be oversubscribed by an end of the current time cycle. For example, for a particular month, utilization adjustment subsystem 114 may determine that periodic utilization threshold data indicates that one hundred logical devices of a particular class are generally built/initialized during a particular month. That is, an average of the prior twelve months may have indicated that one hundred logical devices are predicted to be put into production. Furthermore, based on cloud resource utilization data for a first week of the month, utilization adjustment subsystem 114 may determine that ninety logical devices have been put into production. Thus, ninety percent of the periodic utilization threshold has been reached in a quarter of a month. Accordingly, utilization adjustment subsystem 114 may predict that the particular class will be oversubscribed by the end of that month. In the case of a user's personal finance, utilization adjustment subsystem 114 may determine that the user has spent ninety percent of the user's budget for a particular class of spending (e.g., groceries) in the first week of the month. Accordingly, utilization adjustment subsystem 114 may predict that the particular class will be oversubscribed by the end of that month. Utilization adjustment subsystem 114 may store an indication for each class of whether that class is predicted to be oversubscribed.

FIG. 2 illustrates a data structure for storing a status for each resource. Data structure 200 may include field 203 that stores an identifier of a resource class. The identifier of a resource class may be a string, a number (e.g., decimal or alphanumeric), or another suitable identifier. Field 206 may store a utilization value. The utilization value may be a percentage or another suitable value. Field 209 may store an indicator of whether the corresponding resource class is predicted to be oversubscribed. Field 209 may store a Boolean value (e.g., True or False) or another mechanism to identify classes that are predicted to be oversubscribed (e.g., a value of zero for classes not predicted to be oversubscribed and a value of one for classes predicted to be oversubscribed).

Utilization adjustment subsystem 114 may input, into a machine learning model, the resource utilization data, the periodic utilization threshold data, and one or more indications of the one or more resource classes predicted to be oversubscribed to obtain indications of one or more supplemental resource classes for utilization reduction to address predicted oversubscription of the one or more resource classes. The machine learning model may output one or more indications of which classes may be good supplemental classes for each class that has been predicted to be oversubscribed. FIG. 3 illustrates a data structure 300 representing an output of the machine learning model for each resource class. Field 303 may include an oversubscribed class while field 306 may include the supplemental class and field 309 may store a probability that the supplemental class can supplement the corresponding oversubscribed class. Although FIG. 3 illustrates only one oversubscribed class, data structure 300 may include multiple oversubscribed classes. In some embodiments, the machine learning model may take as input one oversubscribed resource class and output indicators of a plurality of supplemental resource classes and their corresponding probabilities. However, in some embodiments, the machine learning model may take, as input, a plurality of oversubscribed resource classes and output for each oversubscribed resource class corresponding supplemental resource classes and their corresponding probabilities for being able to supplement a particular oversubscribed resource class.

In some embodiments, the machine learning model may have been trained on cloud resource data. Thus, utilization adjustment subsystem 114 may input, into the machine learning model, cloud resource utilization data, the periodic utilization threshold data, and the resource classes predicted to be oversubscribed to determine supplemental resource classes for supplementing the resource classes predicted to be oversubscribed. That is, the machine learning model may take, as input, one or more classes predicted to be oversubscribed. That input may include an identifier of each resource class predicted to be oversubscribed. In addition, the machine learning model may take, as input, the periodic utilization threshold data for each class. The periodic utilization threshold data may be a number of logical devices of a corresponding class that has been predicted to be spun up (e.g., built and initialized).

In some embodiments, the machine learning model may have been trained on a user's personal financial data. For example, the machine learning model may take, as input, a plurality of classes of spending for a user (e.g., grocery spending, housing spending, entertainment spending, etc.) on a monthly basis and an indication of which of those classes have been predicted to be oversubscribed. Each class may have a corresponding monthly threshold spending. For example, grocery spending may be predicted to be at a particular number of dollars, while entertainment spending may be at another amount of dollars. As discussed above, the machine learning model may take, as input, only one class or multiple classes. Thus, the machine learning model may output one or more resource classes that may be used to supplement each resource class predicted to be oversubscribed and a corresponding probability.

In some embodiments, utilization adjustment subsystem 114 may use a priority of each class to determine which classes may be able to supplement classes that are oversubscribed. Thus, utilization adjustment subsystem 114 may retrieve a corresponding priority to each class of the set of resource classes. Each priority may indicate whether a particular resource class is available to supplement another resource class. For example, in a cloud computing example, a class with a corresponding set of resources that is lower than the oversubscribed class may not be a good supplemental class as resources of that class may cause bottlenecks in logical devices created using that set of resources. In a personal finance example, money meant for groceries may not be a good supplement for housing expenses as groceries would have a high priority, while entertainment expenses may be a good supplement for housing expenses. The priority data may be stored in association with the resource class data and may be accessed by utilization adjustment subsystem 114. Utilization adjustment subsystem 114 may retrieve priority data associated with each class and input the corresponding priority into the machine learning model.

In some embodiments, utilization adjustment subsystem 114 may use priority data after the machine learning model outputs a plurality of candidate supplemental classes. For example, if the machine learning model outputs a data structure or data similar to that shown in FIG. 3, utilization adjustment subsystem 114 may access class data for the one or more supplemental resource classes. The class data may include priority information for each class. Utilization adjustment subsystem 114 may determine that a first supplemental resource class of the one or more supplemental resource classes is associated with a first priority. The first priority may indicate that the first supplemental resource class is unavailable to supplement another resource class. For example, "resource class 1" shown in FIG. 3 may be of a medium priority, while "resource class 3" may be of a low priority, "resource class 2" may be of a high priority, and "resource class 4" may be of a lowest priority. Thus, utilization adjustment subsystem 114 may determine that "resource class 3" and "resource class 4" may not be suitable supplemental classes for "resource class 1." Accordingly, utilization adjustment subsystem 114 may remove those classes from the list. That is, utilization adjustment subsystem 114 may remove the first supplemental resource class from the one or more supplemental resource classes.

Figure 4:
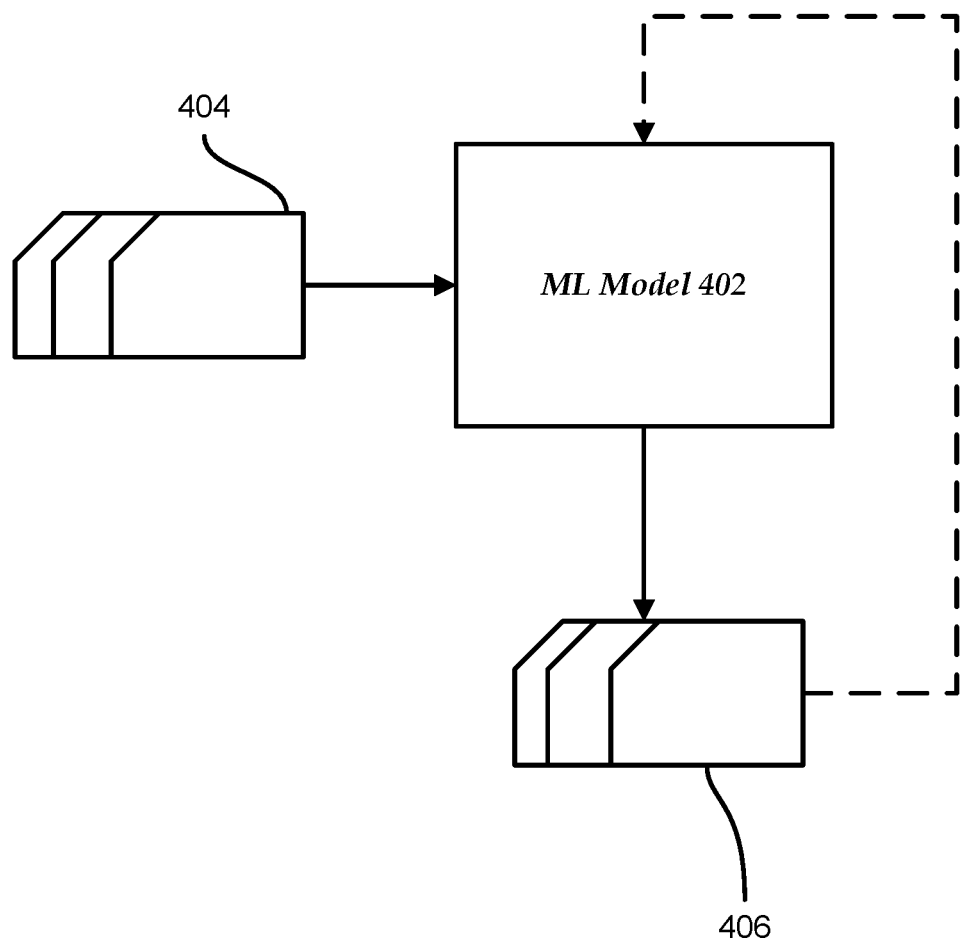
FIG. 4 illustrates an exemplary machine learning model, in accordance with one or more embodiments of this disclosure.

FIG. 4 illustrates an exemplary machine learning model. The machine learning model may have been trained using training utilization data, periodic training threshold data and labelled resource class data (e.g., labelled with oversubscribed resource classes and corresponding supplemental resource classes). Machine learning model 402 may take input 404 (e.g., utilization data and periodic threshold data described above) and may output supplemental resource classes 406 for each oversubscribed class. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, utilization adjustment subsystem 114 may train the machine learning model. Utilization adjustment subsystem 114 may receive a dataset that includes a plurality of entries for training utilization data, period training threshold data, and resource class data. FIG. 5 illustrates an excerpt of dataset 500 that includes a plurality of features for training a machine learning model. Field 503 may include training utilization data (e.g., utilization data as described above). Field 506 may include periodic training threshold data (e.g., periodic training threshold data as described above). Field 509 may include resource class data. The resource class data may be label data for data within field 503 and field 506. That is, given training utilization data in field 503 and corresponding periodic training threshold data in field 506, the correct output for a machine learning model may be resource class data in field 509.

The machine learning model may be trained using utilization adjustment subsystem 114 or another subsystem. For example, resource allocation system 102 may include a training subsystem (not shown). In some embodiments, the machine learning model may be trained on data node 104 and may be used via an application programming interface. Thus, resource allocation system 102 may receive a training dataset that includes training utilization data, periodic training threshold data, and class identifiers for a plurality of resource classes (e.g., a training dataset illustrated in FIG. 5). The plurality of resource classes may include a first set of resource classes labelled as predicted to be oversubscribed and a second set of resource classes labelled as supplemental resource classes for one or more oversubscribed resource classes. Resource allocation system 102 may input the training dataset into a training routine of the machine learning model, to train the machine learning model to output the one or more supplemental resource classes for supplementing resource classes that are predicted to be oversubscribed.

In some embodiments, utilization adjustment subsystem 114 may generate a mapping between each oversubscribed resource class and one or more associated supplemental resource classes. The mapping may be useful when a resource needs to be generated and no resources of the oversubscribed resource class are available, enabling resource allocation system 102 to quickly use a supplemental resource. Utilization adjustment subsystem 114 may determine a first plurality of supplemental resource classes for a first resource class predicted to be oversubscribed. For example, utilization adjustment subsystem 114 may use the machine learning model to identify a set of supplemental resource classes for each class predicted to be oversubscribed.

Utilization adjustment subsystem 114 may select, based on a corresponding priority associated with each of the first plurality of supplemental resource classes, a first supplemental resource class for supplementing the first resource class predicted to be oversubscribed. For example, utilization adjustment subsystem 114 may retrieve priority data for each supplemental class and select one or more supplemental classes for each class predicted to be oversubscribed based on the priority information. In some embodiments, utilization adjustment subsystem 114 may select one or more supplemental classes that best match the priority of the class predicted to be oversubscribed. For example, if the class predicted to be oversubscribed is of a medium priority, utilization adjustment subsystem 114 may select a supplemental class of the same priority. Utilization adjustment subsystem 114 may then generate a mapping between the first resource class predicted to be oversubscribed and the first supplemental resource class.

In some embodiments, utilization adjustment subsystem 114 may generate a hierarchy of available supplemental resource classes. For example, a primary supplemental class may be the supplemental class with the best matching priority. A secondary supplemental class may be a supplemental class with the second best matching priority that is higher than the matching priority and so on. In some embodiments, a lower priority supplemental class may be used, but only when all the higher priority supplemental classes have been fully subscribed.

In some embodiments, utilization adjustment subsystem 114 may use the following operations to use the mappings. Utilization adjustment subsystem 114 may receive a data structure that includes activity data associated with a plurality of resource classes. For example, the activity data may include a set of specifications for building/initializing a computing device. In another example, the activity data may include a request for a transaction (e.g., a credit card transaction, debit card transaction, or another suitable transaction). Utilization adjustment subsystem 114 may retrieve an indication of a required resource for the activity data. For example, utilization adjustment subsystem 114 may determine that a particular resource is required. The resource may be a particular set of requirements for building/initializing a logical computing device. In some embodiments, the resource may be money to be used to purchase a particular good or service associated with a particular class (e.g., a restaurant transaction). Utilization adjustment subsystem 114 may then generate, based on the mapping, the required resource from resources of the supplemental resource class.

In some embodiments, utilization adjustment subsystem 114 may monitor resource usage for supplemental resources and generate a warning when a supplemental resource is predicted to be used. Thus, utilization adjustment subsystem 114 may predict that a resource of a supplemental resource class of the one or more supplemental resource classes will be used. In a cloud-computing environment, utilization adjustment subsystem 114 may make a prediction based on input data on a type of resource that is needed. For example, the input may include a set of required specifications for a logical computing device (e.g., processing power, memory, storage, etc.). In a personal finances example, utilization adjustment subsystem 114 may monitor a user's device and determine when a user is within a vicinity of a location (e.g., in a vicinity of a restaurant). If entertainment class is a supplemental class for a grocery expenses class, utilization adjustment subsystem 114 may predict that a supplemental resource class will be used (e.g., the user will spend money in a restaurant).

In some embodiments, to make the prediction, utilization adjustment subsystem 114 may analyze the requirements for a new resource that has been requested and compare the requirements with resource class definitions. Thus, each resource class may be associated with a particular resource class definition. In a cloud-computing example, the definition may include a set of performance requirements (e.g., processor requirements, memory requirements, storage requirements, etc.). In a personal finance example, the definition may include a category of spending (e.g., grocery spending, entertainment spending, housing spending, etc.). Based on comparing the request for a new resource to resource definitions, utilization adjustment subsystem 114 may determine a class of resource required. Furthermore, utilization adjustment subsystem 114 may determine that the required resource class is a supplemental class for a resource class that is oversubscribed. This determination may be made based on, for example, a mapping between oversubscribed classes and supplemental classes. Utilization adjustment subsystem 114 may pass the data associated with the prediction to warning subsystem 116. The data may include identifiers of the oversubscribed class, the supplemental class, and/or other data.

Warning subsystem 116 may include software components, hardware components, or a combination of both. For example, warning subsystem 116 may include software components that access data stored in storage. Warning subsystem 116 may generate a warning that includes a first indication of the supplemental resource class and a second indication of a resource class that is predicted to be oversubscribed. For example, warning subsystem 116 may generate the warning to be displayed to a user.

In a cloud-computing based embodiment, warning subsystem 116 may, based on predicting that the supplemental resource will be used, generate a warning that includes a utilization reduction indication for the supplemental resource class and an oversubscription prediction indication of a corresponding resource class that is predicted to be oversubscribed. For example, warning subsystem 116 may transmit to a user requesting a logical device to be built/initialized a warning that a particular resource class has been oversubscribed and that the request for the logical device is for a class that supplements the class that has been oversubscribed. Accordingly, generating a new resource of that supplemental class may cause the supplemental class to be oversubscribed. That is, as a result of generating the new resource, there will be no more available resources of that supplemental class.

In a personal finance example, warning subsystem 116 may generate a warning for a user, for example, on a user's mobile device. Warning subsystem 116 may indicate the oversubscribed class (e.g., grocery expenses class) and may indicate the supplemental class (entertainment expenses class). Warning subsystem 116 may indicate that if the user spends a particular sum of money on entertainment expenses, there may not be enough to spend on groceries.

In some embodiments, warning subsystem 116 may generate a warning only when generating the new resource will cause the supplemental class to be oversubscribed. Thus, warning subsystem 116 may determine whether the supplemental resource class is predicted to be oversubscribed based on resource utilization associated with the supplemental resource class. For example, warning subsystem 116 may retrieve a number of resources of the supplemental class available to be generated and determine whether generating one more resource will cause the supplemental class to be oversubscribed so that no more resources of that class may be generated. In response to determining that the supplemental resource class is predicted to be oversubscribed, warning subsystem 116 may generate the warning. In response to determining that the supplemental resource class is predicted to not be oversubscribed, warning subsystem 116 may refrain from generating the warning.

In some embodiments, to generate a new resource when an oversubscribed class does not have any more available resources, resource allocation system 102 may perform the following operations. Resource allocation system 102 may receive a request for a first resource of a first resource class. The request may include a set of parameters or a category for the first resource class. Resource allocation system 102 may determine that the first resource class has been oversubscribed and does not have any more available resources. Resource allocation system 102 may identify (e.g., based on a mapping between oversubscribed resources and supplemental resources) a plurality of supplemental resource classes for the first resource class. In some embodiments, each supplemental resource class may be associated with a corresponding priority. Resource allocation system 102 may then allocate the first resource according to each corresponding priority of each supplemental resource class. That is, resource allocation system 102 may allocate a resource of a resource class with a best matching priority.

Computing Environment

Figure 6:
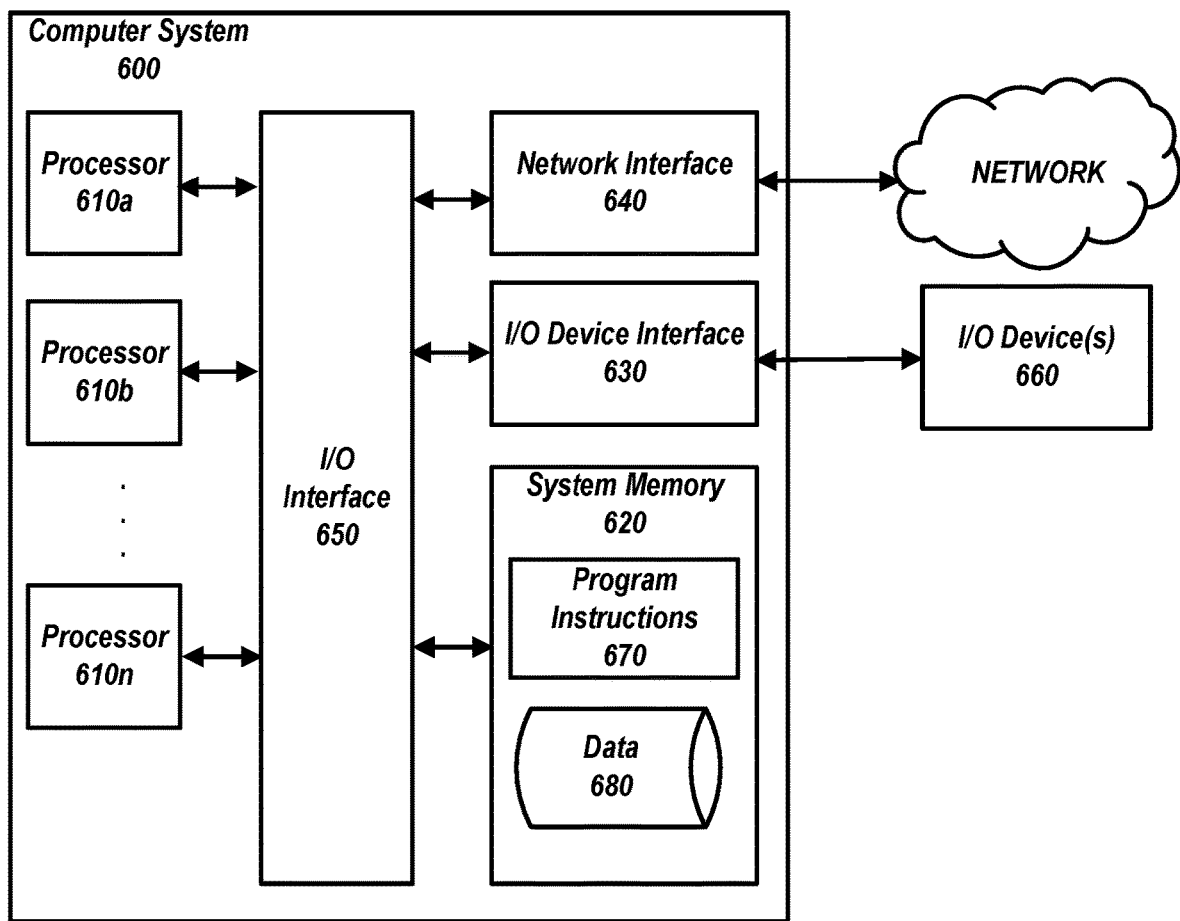
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
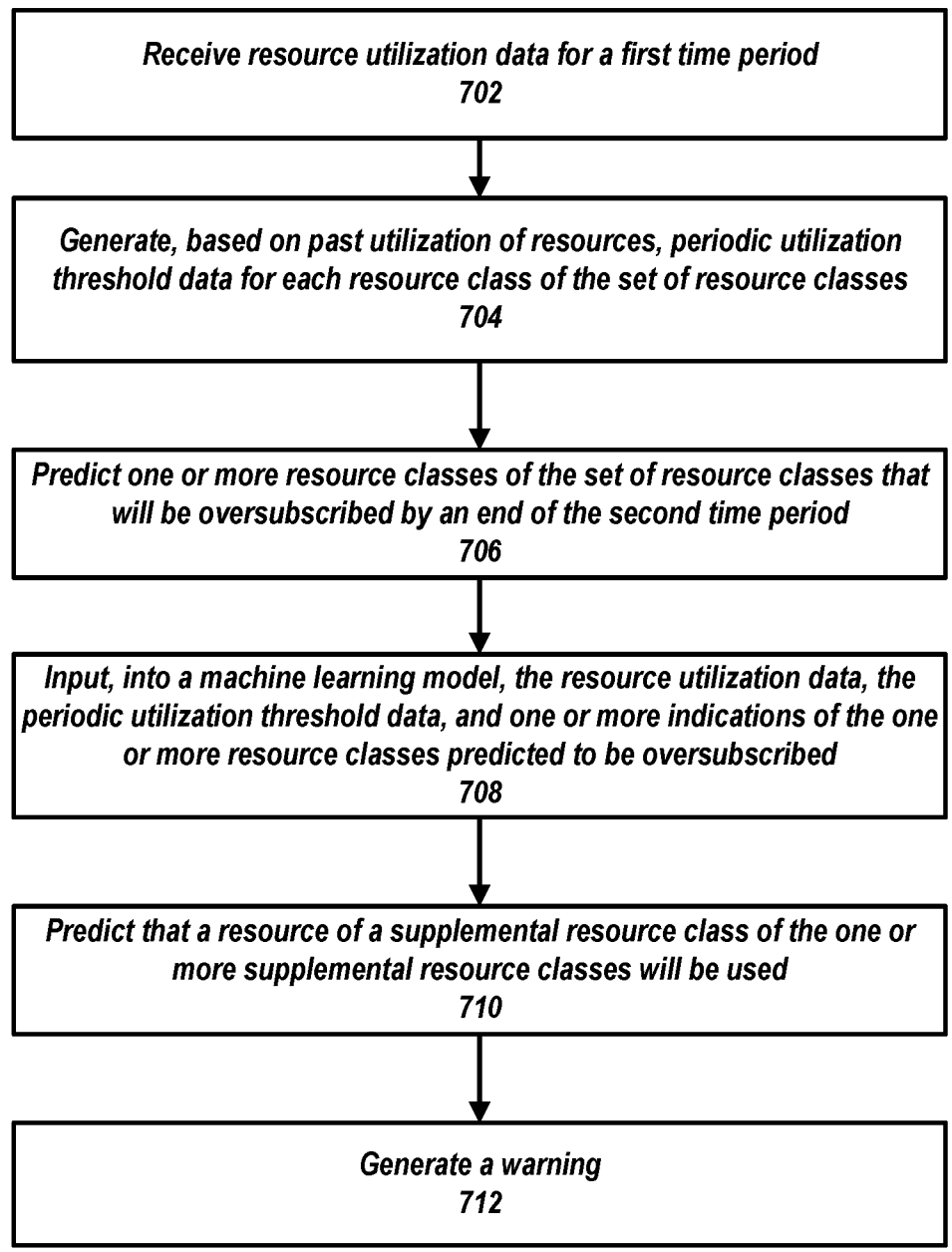
FIG. 7 is a flowchart of operations for dynamically adjusting resource allocation, in accordance with one or more embodiments of this disclosure.

FIG. 7 is a flowchart 700 of operations for dynamically adjusting resource allocation. The operations of FIG. 7 may use components described in relation to FIG. 6. In some embodiments, resource allocation system 102 may include one or more components of computer system 600. At 702, resource allocation system 102 receives resource utilization data for a first time period. For example, resource allocation system 102 may receive the resource utilization data from data node 104 or from one of utilization sources 108a-108n. Resource allocation system 102 may receive the resource utilization data over network 150 using network interface 640.

At 704, resource allocation system 102 generates, based on past utilization of resources, periodic utilization threshold data for each resource class of the set of resource classes. Resource allocation system 102 may use one or more processors 610a, 610b, and/or 610n to perform the generation. At 706, resource allocation system 102 predicts one or more resource classes of the set of resource classes that will be oversubscribed by an end of the second time period. For example, resource allocation system 102 may use one or more processors 610a-610n to perform the operation and store the results in system memory 620.

At 708, resource allocation system 102 inputs, into a machine learning model, the resource utilization data, the periodic utilization threshold data, and one or more indications of the one or more resource classes predicted to be oversubscribed. Resource allocation system 102 may use one or more processors 610a, 610b, and/or 610n to perform the input operation. At 710, resource allocation system 102 predicts that a resource of a supplemental resource class of the one or more supplemental resource classes will be used. Resource allocation system 102 may use one or more processors 610a, 610b, and/or 610n to perform this operation. At 712, resource allocation system 102 generates a warning. Resource allocation system 102 may use one or more processors 610a, 610b, and/or 610n to perform this operation. Resource allocation system 102 may use network interface 640 to transmit the warning over a network (e.g., network 150).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for dynamically adjusting resource allocation, the method comprising: receiving resource utilization data for a first time period, wherein the resource utilization data comprises a set of resource classes and corresponding utilization values for the set of resource classes; generating, based on past utilization of resources, periodic utilization threshold data for each resource class of the set of resource classes, wherein the periodic utilization threshold data is generated for a second time period longer than and including the first time period; predicting, based on the resource utilization data and the periodic utilization threshold data, one or more resource classes of the set of resource classes that will be oversubscribed by an end of the second time period; inputting, into a machine learning model, the resource utilization data, the periodic utilization threshold data, and one or more indications of the one or more resource classes predicted to be oversubscribed to obtain indications of one or more supplemental resource classes for utilization reduction to address predicted oversubscription of the one or more resource classes; predicting that a resource of a supplemental resource class of the one or more supplemental resource classes will be used; and generating a warning comprising a first indication of the supplemental resource class and a second indication of a resource class that is predicted to be oversubscribed.

2. Any of the preceding embodiments, further comprising: retrieving a corresponding priority to each class of the set of resource classes, wherein each priority indicates whether a particular resource class is available to supplement another resource class; and inputting the corresponding priority into the machine learning model.

3. Any of the preceding embodiments, further comprising: accessing class data for the one or more supplemental resource classes; determining that a first supplemental resource class of the one or more supplemental resource classes is associated with a first priority, wherein the first priority indicates that the first supplemental resource class is unavailable to supplement another resource class; and removing the first supplemental resource class from the one or more supplemental resource classes.

4. Any of the preceding embodiments, further comprising: receiving a request for a first resource of a first resource class; identifying a plurality of supplemental resource classes for the first resource class, wherein each supplement resource class is associated with a corresponding priority; and allocating the first resource according to each corresponding priority of each supplemental resource class.

5. Any of the preceding embodiments, further comprising: receiving a training dataset comprising training utilization data, periodic training threshold data, and class identifiers for a plurality of resource classes, wherein the plurality of resource classes comprises a first set of resource classes labelled as predicted to be oversubscribed and a second set of resource classes labelled as supplemental resource classes for one or more oversubscribed resource classes; and inputting the training dataset into a training routine of the machine learning model, to train the machine learning model to output the one or more supplemental resource classes for supplementing resources classes that are predicted to be oversubscribed.

6. Any of the proceeding embodiments, wherein generating the warning comprises: determining whether the supplemental resource class is predicted to be oversubscribed based on resource utilization associated with the supplemental resource class; in response to determining that the supplemental resource class is predicted to be oversubscribed, generating the warning; and in response to determining that the supplemental resource class is predicted to not be oversubscribed, refraining from generating the warning.

7. Any of the preceding embodiments, further comprising: determining a first plurality of supplemental resource classes for a first resource class predicted to be oversubscribed; selecting, based on a corresponding priority associated with each of the first plurality of supplemental resource classes, a first supplemental resource class for supplementing the first resource class predicted to be oversubscribed; and generating a mapping between the first resource class predicted to be oversubscribed and the first supplemental resource class.

8. Any of the preceding embodiments, further comprising: receiving a data structure comprising activity data associated with a plurality of resource classes; retrieving an indication of a required resource for the activity data; and generating, based on the mapping, the required resource from resources of the supplemental resource class.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for dynamically adjusting cloud resource allocation, the system comprising:
   one or more processors; and
   one or more non-transitory computer-readable storage media storing instructions that, when executed by the one or more processors, cause the one or more processors to perform operations comprising:
      receiving, from a cloud controller, cloud resource utilization data for a portion of a current time cycle, wherein the cloud resource utilization data comprises a set of resource classes and corresponding utilization values for the set of resource classes;
      generating, based on past utilization of cloud resources, periodic utilization threshold data for each resource class of the set of resource classes, wherein the periodic utilization threshold data is generated for a periodic time cycle;
      predicting, based on the cloud resource utilization data and the periodic utilization threshold data, resource classes of the set of resource classes that will be oversubscribed by an end of the current time cycle;
      inputting, into a machine learning model, the cloud resource utilization data, the periodic utilization threshold data and the resource classes predicted to be oversubscribed to determine one or more supplemental resource classes for supplementing the resource classes predicted to be oversubscribed, wherein the machine learning model is trained by:
         receiving a training dataset comprising training utilization data, periodic training threshold data, and class identifiers for a plurality of training resource classes, wherein the plurality of training resource classes comprises a first set of training resource classes labelled as predicted to be oversubscribed and a second set of training resource classes labelled as supplemental resource classes for one or more oversubscribed resource classes;
         inputting the training dataset into a training routine of the machine learning model;
      predicting that a supplemental resource of a supplemental resource class of the supplemental resource classes will be used during the current time cycle; and
      based on predicting that the supplemental resource will be used, generating a warning comprising a utilization reduction indication for the supplemental resource class and an oversubscription prediction indication of a corresponding resource class that is predicted to be oversubscribed, thereby causing a reduction in utilization during execution of the supplemental resource class.

2. The system of claim 1, wherein the instructions further cause the one or more processors to perform operations comprising:
   retrieving a corresponding priority to each class of the set of resource classes, wherein each priority indicates whether a particular resource class is available to supplement another resource class; and
   inputting the corresponding priority into the machine learning model.

3. The system of claim 1, wherein the instructions further cause the one or more processors to perform operations comprising:
   accessing class data for the supplemental resource classes;
   determining that a first supplemental resource class of the supplemental resource classes is associated with a first priority, wherein the first priority indicates that the first supplemental resource class is unavailable to supplement another resource class; and
   removing the first supplemental resource class from the supplemental resource classes.

4. The system of claim 1, wherein the instructions further cause the one or more processors to perform operations comprising:
   receiving a request for a first resource of a first resource class;
   identifying a plurality of supplemental resource classes for the first resource class, wherein each supplemental resource class is associated with a corresponding priority; and
   allocating the first resource according to each corresponding priority of each supplemental resource class.

5. The system of claim 1, wherein generating the warning comprises:
   determining whether the supplemental resource class is predicted to be oversubscribed based on resource utilization associated with the supplemental resource class;
   in response to determining that the supplemental resource class is predicted to be oversubscribed, generating the warning; and
   in response to determining that the supplemental resource class is predicted to not be oversubscribed, refraining from generating the warning.

6. The system of claim 1, wherein the instructions further cause the one or more processors to perform operations comprising:
   determining a first plurality of supplemental resource classes for a first resource class predicted to be oversubscribed;
   selecting, based on a corresponding priority associated with each of the first plurality of supplemental resource classes, a first supplemental resource class for supplementing the first resource class predicted to be oversubscribed; and generating a mapping between the first resource class predicted to be oversubscribed and the first supplemental resource class.

7. A method for dynamically adjusting resource allocation, the method comprising:
receiving resource utilization data for a first time period, wherein the resource utilization data comprises a set of resource classes and corresponding utilization values for the set of resource classes;
generating, based on past utilization of resources, periodic utilization threshold data for each resource class of the set of resource classes, wherein the periodic utilization threshold data is generated for a second time period longer than and including the first time period;
predicting, based on the resource utilization data and the periodic utilization threshold data, one or more resource classes of the set of resource classes that will be oversubscribed by an end of the second time period;
inputting, into a machine learning model, the resource utilization data, the periodic utilization threshold data, and one or more indications of the one or more resource classes predicted to be oversubscribed to obtain indications of one or more supplemental resource classes for utilization reduction to address predicted oversubscription of the one or more resource classes, wherein the machine learning model is trained by:
receiving a training dataset comprising training utilization data, periodic training threshold data, and class identifiers for a plurality of training resource classes, wherein the plurality of training resource classes comprises a first set of training resource classes labelled as predicted to be oversubscribed and a second set of training resource classes labelled as supplemental resource classes for one or more oversubscribed resource classes;
inputting the training dataset into a training routine of the machine learning model;
predicting that a resource of a supplemental resource class of the one or more supplemental resource classes will be used; and
based on predicting that the supplemental resource will be used, generating a warning comprising a first indication of the supplemental resource class and a second indication of a resource class that is predicted to be oversubscribed, thereby causing a reduction in utilization during execution of the supplemental resource class.

8. The method of claim 7, further comprising:
retrieving a corresponding priority to each class of the set of resource classes, wherein each priority indicates whether a particular resource class is available to supplement another resource class; and
inputting the corresponding priority into the machine learning model.

9. The method of claim 7, further comprising:
accessing class data for the one or more supplemental resource classes;
determining that a first supplemental resource class of the one or more supplemental resource classes is associated with a first priority, wherein the first priority indicates that the first supplemental resource class is unavailable to supplement another resource class; and
removing the first supplemental resource class from the one or more supplemental resource classes.

10. The method of claim 7, further comprising:
receiving a request for a first resource of a first resource class;
identifying a plurality of supplemental resource classes for the first resource class, wherein each supplemental resource class is associated with a corresponding priority; and
allocating the first resource according to each corresponding priority of each supplemental resource class.

11. The method of claim 7, wherein generating the warning comprises:
determining whether the supplemental resource class is predicted to be oversubscribed based on resource utilization associated with the supplemental resource class;
in response to determining that the supplemental resource class is predicted to be oversubscribed, generating the warning; and
in response to determining that the supplemental resource class is predicted to not be oversubscribed, refraining from generating the warning.

12. The method of claim 7, further comprising:
determining a first plurality of supplemental resource classes for a first resource class predicted to be oversubscribed;
selecting, based on a corresponding priority associated with each of the first plurality of supplemental resource classes, a first supplemental resource class for supplementing the first resource class predicted to be oversubscribed; and
generating a mapping between the first resource class predicted to be oversubscribed and the first supplemental resource class.

13. The method of claim 12, further comprising:
receiving a data structure comprising activity data associated with a plurality of resource classes;
retrieving an indication of a required resource for the activity data; and
generating, based on the mapping, the required resource from resources of the supplemental resource class.

14. A non-transitory computer-readable medium for dynamically adjusting resource allocation, storing instructions that, when executed by one or more processors, cause the one or more processors to perform operations comprising:
receiving resource utilization data for a first time period, wherein the resource utilization data comprises a set of resource classes and corresponding utilization values for the set of resource classes;
generating, based on past utilization of resources, periodic utilization threshold data for each resource class of the set of resource classes, wherein the periodic utilization threshold data is generated for a second time period longer than and including the first time period;
predicting, based on the resource utilization data and the periodic utilization threshold data, one or more resource classes of the set of resource classes that will be oversubscribed by an end of the second time period;
inputting, into a machine learning model, the resource utilization data, the periodic utilization threshold data, and one or more indications of the one or more resource classes predicted to be oversubscribed to obtain indications of one or more supplemental resource classes for utilization reduction to address predicted oversubscription of the one or more resource classes, wherein the machine learning model is trained by:

receiving a training dataset comprising training utilization data, periodic training threshold data, and class identifiers for a plurality of training resource classes, wherein the plurality of training resource classes comprises a first set of training resource classes labelled as predicted to be oversubscribed and a second set of training resource classes labelled as supplemental resource classes for one or more oversubscribed resource classes;

inputting the training dataset into a training routine of the machine learning model;

predicting that a resource of a supplemental resource class of the one or more supplemental resource classes will be used; and based on predicting that the supplemental resource will be used, generating a warning comprising a first indication of the supplemental resource class and a second indication of a resource class that is predicted to be oversubscribed, thereby causing a reduction in utilization during execution of the supplemental resource class.

15. The non-transitory computer-readable medium of claim 14, wherein the instructions further cause the one or more processors to perform operations comprising:

retrieving a corresponding priority to each class of the set of resource classes, wherein each priority indicates whether a particular resource class is available to supplement another resource class; and inputting the corresponding priority into the machine learning model.

16. The non-transitory computer-readable medium of claim 14, wherein the instructions further cause the one or more processors to perform operations comprising:

accessing class data for the one or more supplemental resource classes;

determining that a first supplemental resource class of the one or more supplemental resource classes is associated with a first priority, wherein the first priority indicates that the first supplemental resource class is unavailable to supplement another resource class; and removing the first supplemental resource class from the one or more supplemental resource classes.

17. The non-transitory computer-readable medium of claim 14, wherein the instructions further cause the one or more processors to perform operations comprising:

receiving a request for a first resource of a first resource class;

identifying a plurality of supplemental resource classes for the first resource class, wherein each supplemental resource class is associated with a corresponding priority; and allocating the first resource according to each corresponding priority of each supplemental resource class.

18. The non-transitory computer-readable medium of claim 14, wherein the instructions for generating the warning further cause the one or more processors to perform operations comprising:

determining whether the supplemental resource class is predicted to be oversubscribed based on resource utilization associated with the supplemental resource class;

in response to determining that the supplemental resource class is predicted to be oversubscribed, generating the warning; and in response to determining that the supplemental resource class is predicted to not be oversubscribed, refraining from generating the warning.

19. The non-transitory computer-readable medium of claim 14, wherein the instructions further cause the one or more processors to perform operations comprising:

determining a first plurality of supplemental resource classes for a first resource class predicted to be oversubscribed;

selecting, based on a corresponding priority associated with each of the first plurality of supplemental resource classes, a first supplemental resource class for supplementing the first resource class predicted to be oversubscribed; and generating a mapping between the first resource class predicted to be oversubscribed and the first supplemental resource class.

20. The non-transitory computer-readable medium of claim 19, wherein the instructions further cause the one or more processors to perform operations comprising:

receiving a data structure comprising activity data associated with a plurality of resource classes;

retrieving an indication of a required resource for the activity data; and generating, based on the mapping, the required resource from resources of the supplemental resource class.

* * * * *